(12) United States Patent
Sadamitsu et al.

(10) Patent No.: US 9,234,459 B2
(45) Date of Patent: Jan. 12, 2016

(54) TURBOCHARGER AND WHEEL HOUSING (75) Inventors: Takahiro Sadamitsu, Nisshin (JP); Tatsuo Iida, Anjo (JP)

(73) Assignee: TOYOTA JIDOSHA KABUSHIKI KAISHA, Aichi-ken (JP)

(*) Notice: Subject to any disclaimer, the term of this patent is extended or adjusted under 35 U.S.C. 154(b) by 804 days.

(21) Appl. No.: 13/522,125

(22) PCT Filed: Jan. 4, 2011

(86) PCT No.: PCT/IB2011/000167
§ 371 (c)(1),
(2), (4) Date: Jul. 13, 2012

(87) PCT Pub. No.: WO2011/086467
PCT Pub. Date: Jul. 21, 2011

(65) Prior Publication Data
US 2012/0294712 A1    Nov. 22, 2012

(30) Foreign Application Priority Data
Jan. 15, 2010  (JP) .................................. 2010-006779

(51) Int. Cl.
*F04D 29/54* (2006.01)
*F02C 6/12* (2006.01)
(Continued)

(52) U.S. Cl.
CPC . *F02C 6/12* (2013.01); *F01D 9/026* (2013.01); *F01D 25/24* (2013.01); *F05D 2220/40* (2013.01); *F05D 2230/237* (2013.01);
(Continued)

(58) Field of Classification Search
CPC ............ F02C 6/12; F01D 9/026; F01D 25/24

USPC ........................................................ 415/205
See application file for complete search history.

(56) References Cited

U.S. PATENT DOCUMENTS

| | | |
|---|---|---|
| 2,981,516 A | 4/1961 | Egli |
| 4,376,617 A | 3/1983 | Okano et al. |
| 2002/0192076 A1 | 12/2002 | Hansen et al. |

(Continued)

FOREIGN PATENT DOCUMENTS

| | | |
|---|---|---|
| DE | 299 09 018 U1 | 9/2000 |
| DE | 100 22 052 A1 | 3/2001 |

(Continued)

OTHER PUBLICATIONS

FR 2795769 A1, Doll et al., Jan. 2001, France, English translation of description.*

(Continued)

*Primary Examiner* — Dwayne J White
*Assistant Examiner* — Jason Fountain
(74) *Attorney, Agent, or Firm* — Sughrue Mion, PLLC (57) ABSTRACT

A turbine housing of a turbocharger is formed by joining a scroll body with a base body. An exhaust passageway is formed between the scroll body and the base body. At the joint portion between the scroll body and the base body, an inside corner portion is formed by an inner peripheral surface of the scroll body that faces the exhaust passageway, and an outer peripheral surface of the base body that also faces the exhaust passageway. An inside fillet that is shaped to change the direction of exhaust gas along the inner peripheral surface of the scroll body to a direction along the outer peripheral surface of the base body is formed on the inside corner portion.

6 Claims, 10 Drawing Sheets

(51) Int. Cl.
  *F01D 9/02* (2006.01)
  *F01D 25/24* (2006.01)
(52) U.S. Cl.
  CPC ......... *F05D2230/50* (2013.01); *F05D 2230/60* (2013.01); *F05D 2250/71* (2013.01)

(56) References Cited

U.S. PATENT DOCUMENTS

2007/0199977 A1  8/2007  Pollard et al.
2010/0310364 A1* 12/2010  Botsch et al. ............ 415/212.1

FOREIGN PATENT DOCUMENTS

| EP | 1422399 A1 | 5/2004 | |
| FR | 2795769 A1 * | 1/2001 | ............... F02C 6/12 |
| JP | 02-251393 A | 10/1990 | |
| JP | 2002-004871 A | 1/2002 | |
| JP | 2003-120303 A | 4/2002 | |
| JP | 2006-207526 A | 8/2006 | |
| JP | 2007-224827 A | 9/2007 | |
| JP | 2008-019798 A | 1/2008 | |
| JP | 2008-106667 A | 5/2008 | |
| JP | 2008-208732 A | 9/2008 | |
| JP | 2009-008013 A | 1/2009 | |
| JP | 2009-243375 A | 10/2009 | |
| JP | 2009-243396 A | 10/2009 | |
| JP | 2009-281182 A | 12/2009 | |

OTHER PUBLICATIONS

International Search Report and Written Opinion for corresponding International Patent Application No. PCT/IB2011/000167 mailed on Aug. 22, 2011.
Japanese Office Action for corresponding JP Patent Application No. 2010-006779 issued on Dec. 28, 2011.
Communication dated Mar. 18, 2015, issued by the European Patent Office in counterpart European application No. 11 708 078.8.

* cited by examiner

TURBOCHARGER AND WHEEL HOUSING

BACKGROUND OF THE INVENTION

1. Field of the Invention

The invention relates to a wheel housing for a turbocharger that is assembled by joining a first structural body to a second structural body that have been separately formed, and in which a gas passageway is formed between the first structural body and the second structural body. The invention also relates to a turbocharger that includes the wheel housing.

2. Description of the Related Art

For example, Japanese Patent Application Publication No. 2008-106667 (JP-A-2008-106667) describes a wheel housing for a turbocharger which is made by separately forming a metal-sheet-made scroll body as a first structural body and a metal-sheet-made base body as a second structural body, and then welding the scroll body to the base body.

In the above-described turbine housing, a corner portion is formed by a surface of the scroll body and a surface of the base body, so that exhaust gas flow near the corner portion is disturbed.

Figure 12:
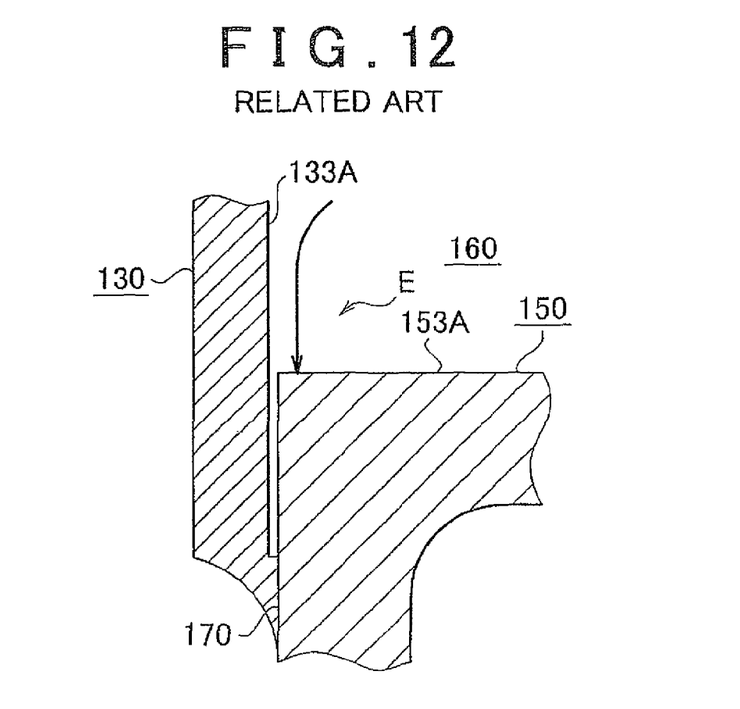
FIG. 12 is a sectional view of a corner portion in a related-art turbine housing.

As shown in FIG. 12, a corner portion E is formed by the inner peripheral surface 133A of a scroll body 130 that faces an exhaust passageway 160 and the outer peripheral surface of a base portion 150, which also faces the exhaust passageway 160. When exhaust gas in the exhaust passageway 160 strikes the corner portion E, the flow of exhaust gas is disturbed.

SUMMARY OF INVENTION

The invention provides a turbocharger and a wheel housing thereof that minimizes the disturbance of gas flow in a gas passageway by employing a structure in which a first structural body is joined to a second structural body.

A first aspect of the inventing relates to a wheel housing for a turbocharger. The wheel housing includes: a first structural body; a second structural body that is formed separately from the first structural body and that is joined to the first structural body; and a gas passageway formed between the first structural body and the second structural body, wherein: a joint portion between the first structural body and the second structural body is provided with a corner portion that is formed by a first surface of the first structural body which faces the gas passageway and a second surface of the second structural body which faces the gas passageway; and the corner portion is provided with a guide portion that has such a shape as to change a direction of flow of a gas along the first surface to a direction along the second surface.

According to the foregoing aspect, the corner portion that is formed in the joint portion between the first structural body and the second structural body by the first surface that faces the gas passageway and the second surface that faces the gas passageway is provided with the guide portion that has such a shape as to change the direction of flow of the gas along the first surface to a direction along the second surface. Therefore, it becomes possible to restrain occurrence of disturbance of gas flow in the gas passageway while adopting a structure in which the first structural body and the second structural body are joined to each other.

In the foregoing wheel housing, the first structural body and the second structural body may be joined to each other by brazing, and the guide portion may be a fillet that is formed by the brazing.

According to this construction, the first structural body and the second structural body are joined to each other by brazing, the fillet formed of the brazing material is used as a guide portion. Therefore, the brazing operation accomplishes both the junction between the first structural body and the second structural body and the formation of the guide portion, so that the productivity of the turbocharger can be improved.

In the foregoing construction, the first surface may be provided with a first restriction portion that restricts flow of a brazing material that forms the fillet, and the second surface may be provided with a second restriction portion that restricts flow of the brazing material that forms the fillet.

According to this construction, the first surface is provided with the first restriction portion, and the second surface is provided with the second restriction portion. Hence, the size of the fillet serving as a guide portion can be appropriately managed.

In the foregoing construction, the first structural body may be a scroll body that is made of a press-formed metal sheet and that includes a scroll-shaped site, and the second structural body may be a base body that includes a flange portion, and the gas passageway may be formed between the scroll-shaped site and the flange portion.

According to this construction, since the metal-sheet-made first structural body and the metal-sheet-made second structural body are joined together by brazing, it is possible to restrain occurrence of excessively great deformation in the structural bodies caused by heat during the joining process, in comparison with the case where the joining process includes welding.

In the foregoing construction, the first structural body may include a first site in which larger distortion occurs than in another site when residual stress caused in association with press-forming is released, and the second structural body may include a second site in which larger distortion occurs than in another site when residual stress caused in association with press-forming is released, and in the wheel housing, the first structural body and the second structural body may be disposed and joined to each other so that a direction of deformation of the second site caused in association with release of the residual stress coincides with a direction of deformation of the first site caused in association with release of the residual stress.

The press-formed first structural body and the press-formed second structural body have residual stress due to the press-forming process. Therefore, when the first structural body and the second structural body are joined by brazing, the residual stress is released due to heat. At this time, distortion occurs in the direction of the residual tress in each structural body. Besides, the direction and the magnitude of distortion varies according to the direction and the magnitude of the residual stress that is released at each site in each of the structural bodies.

Let it assumed that the first and second structural bodies are joined so that the first site in the first structural body where relatively large distortion occurs corresponds to or coincides with a site in the second structural body where relatively small distortion or substantially no distortion occurs. In this assumed case, the distortion in the first site moves the first site away from the foregoing corresponding or coinciding site of the second structural part. Therefore, large gaps are formed partly between the first structural body and the second structural body.

In contrast, in the foregoing construction of the invention, the two structural bodies are joined so that the first site of the first structural body in which relatively large distortion occurs corresponds in phase to the second site of the second structural body in which relatively large distortion occurs. Therefore, the distortion of the first site and the distortion of the second site act in such a direction as to reduce the gap formed between the first structural body and the second structural body. Due to this, it is possible to restrain formation of a large gap in the joint portion between the structural bodies.

In the foregoing construction, the wheel housing may be a turbine housing of the turbocharger.

According to this construction, in the turbine housing in which the first structural body and the second structural body that have been separately formed are joined to each other and in which an exhaust passageway is formed between the first structural body and the second structural body, the corner portion of the joint portion between the first structural body and the second structural body is provided with a guide portion. Due to this, it is possible to restrain occurrence of disturbance in the flow of exhaust gas.

In the foregoing construction, the wheel housing may be a compressor housing of the turbocharger.

According to this construction, in the compressor housing in which the first structural body and the second structural body that have been separately formed are joined to each other and in which an exhaust passageway is formed between the first structural body and the second structural body, the corner portion of the joint portion between the first structural body and the second structural body is provided with a guide portion. Due to this, it is possible to restrain occurrence of disturbance in the flow of exhaust gas.

A second aspect of the invention relates to a turbocharger. This turbocharger includes the foregoing wheel housing.

BRIEF DESCRIPTION OF DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

A first embodiment of the invention will be described with reference to FIG. 1 to FIG. 8. In this embodiment, the invention is embodied as a turbine housing of a turbocharger for an internal combustion engine.

Figure 1:
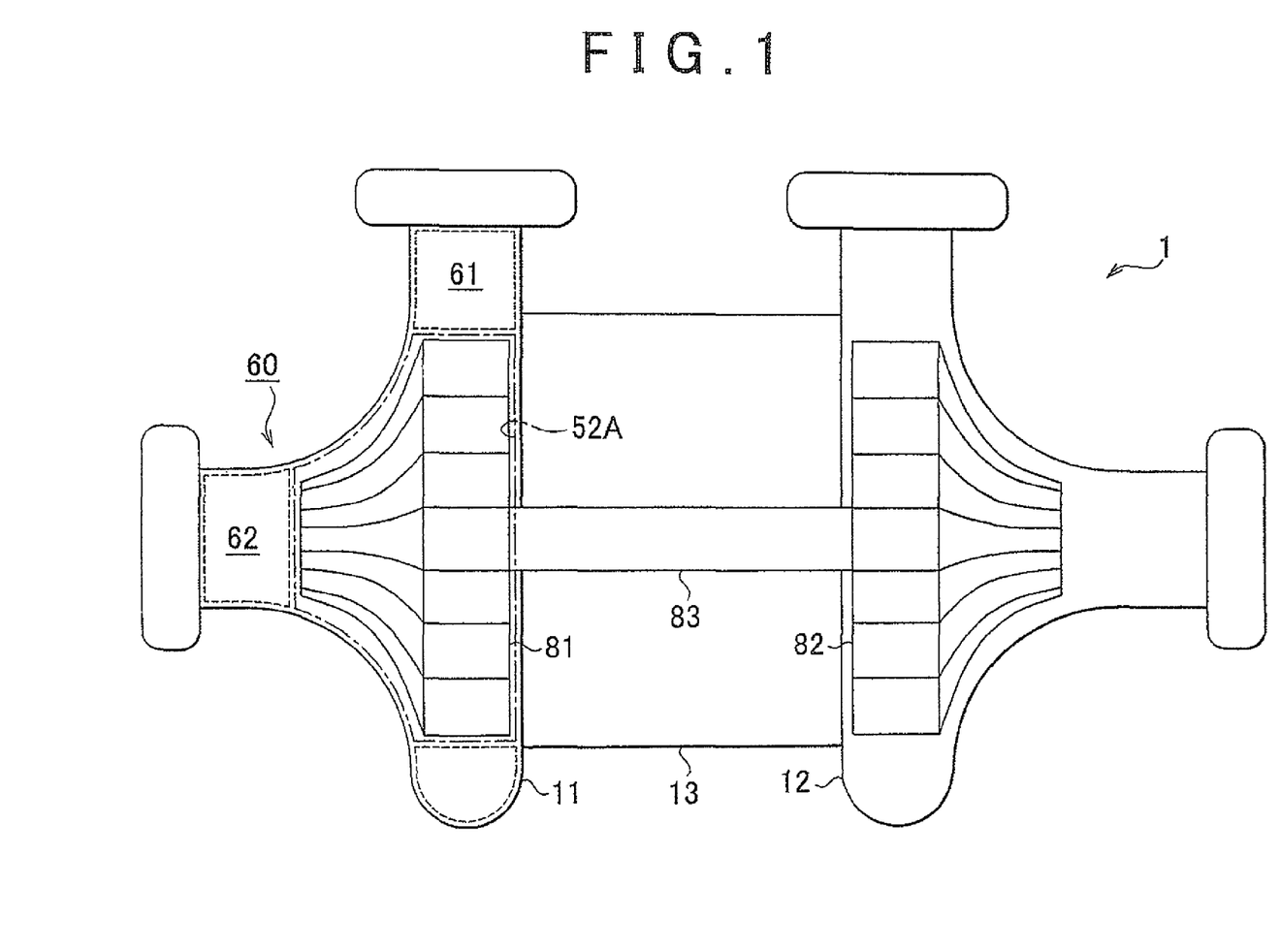
FIG. 1 shows the general structure of a turbocharger in accordance with a first embodiment of the invention.

As shown in FIG. 1, a turbocharger 1 includes: a turbine wheel 81 that is rotated by energy of exhaust gas; a compressor wheel 82 that compresses intake air as the turbine wheel 81 rotates; a rotor shaft 83 that connects the turbine wheel 81 to the compressor wheel 82; a turbine housing 11 that houses the turbine wheel 81; a compressor housing 12 that houses the compressor wheel 82; and a center housing 13 that houses the rotor shaft 83.

In the turbocharger 1, because the turbine wheel 81 and the compressor wheel 82 are connected to the rotor shaft 83, these three elements rotate together as a single unit. In addition, because the turbine housing 11, the compressor housing 12 and the center housing 13 are connected to each other, these three elements are combined as an unitary element.

Within the turbine housing 11, there are formed a wheel chamber 52A that houses the turbine wheel 81, and an exhaust passageway 60 that directs exhaust gas to flow from an exhaust pipe upstream of the turbine housing 11 to an exhaust pipe downstream of the turbine housing 11. The exhaust passageway 60 is formed by the wheel chamber 52A that houses the turbine wheel 81, a scroll passageway 61 that directs exhaust gas from the upstream exhaust pipe to the wheel chamber 52A, and an outlet passageway 62 that directs the exhaust gas from the turbine wheel 81 to the downstream exhaust pipe.

Figure 2:
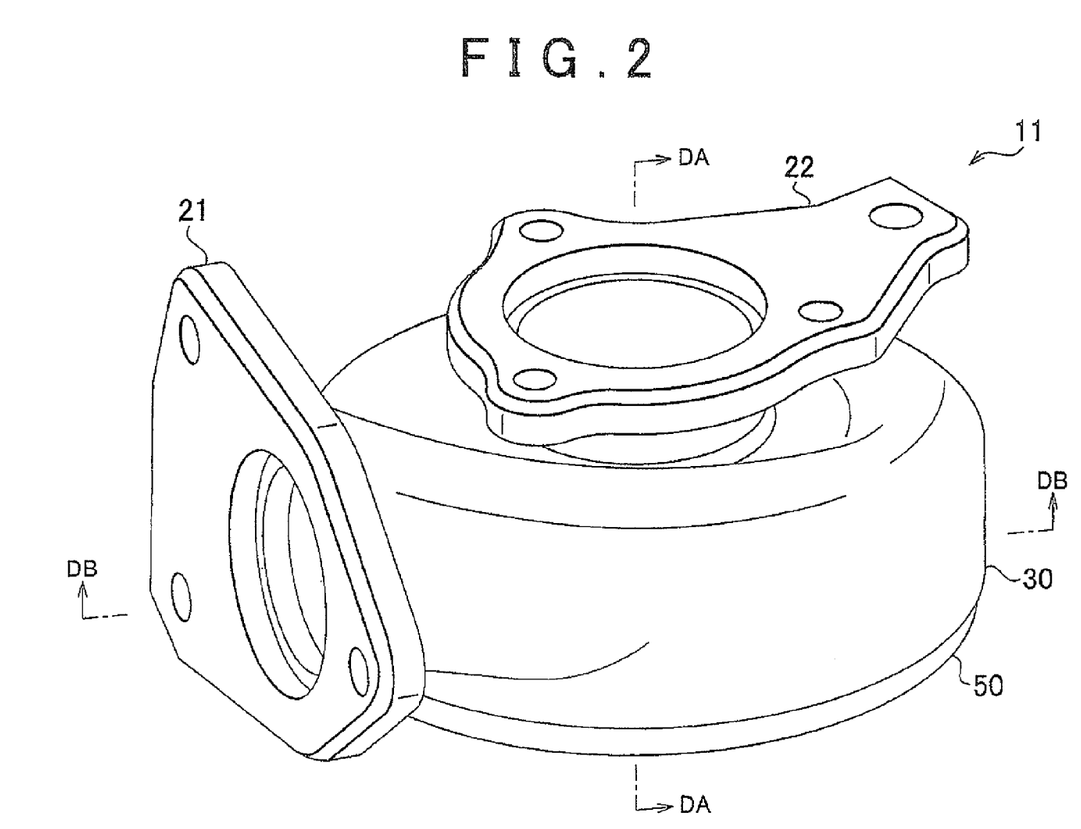
FIG. 2 is a perspective view of a turbine housing in accordance with the first embodiment of the invention.

A structure of the turbine housing 11 will be described with reference to FIG. 2 to FIG. 4. As shown in FIG. 2, the turbine housing 11 includes: a scroll body 30 and a base body 50 that together form the exhaust passageway 60; an inlet flange 21 to which the exhaust pipe upstream of the turbine housing 11 is connected; and an outlet flange 22 to which the exhaust pipe downstream of the turbine housing 11 is connected. The scroll body 30 and the base body 50 are metal-sheet-made bodies that have been formed by pressing. The inlet flange 21 and the outlet flange 22 used in this embodiment are made by casting.

Figure 3:
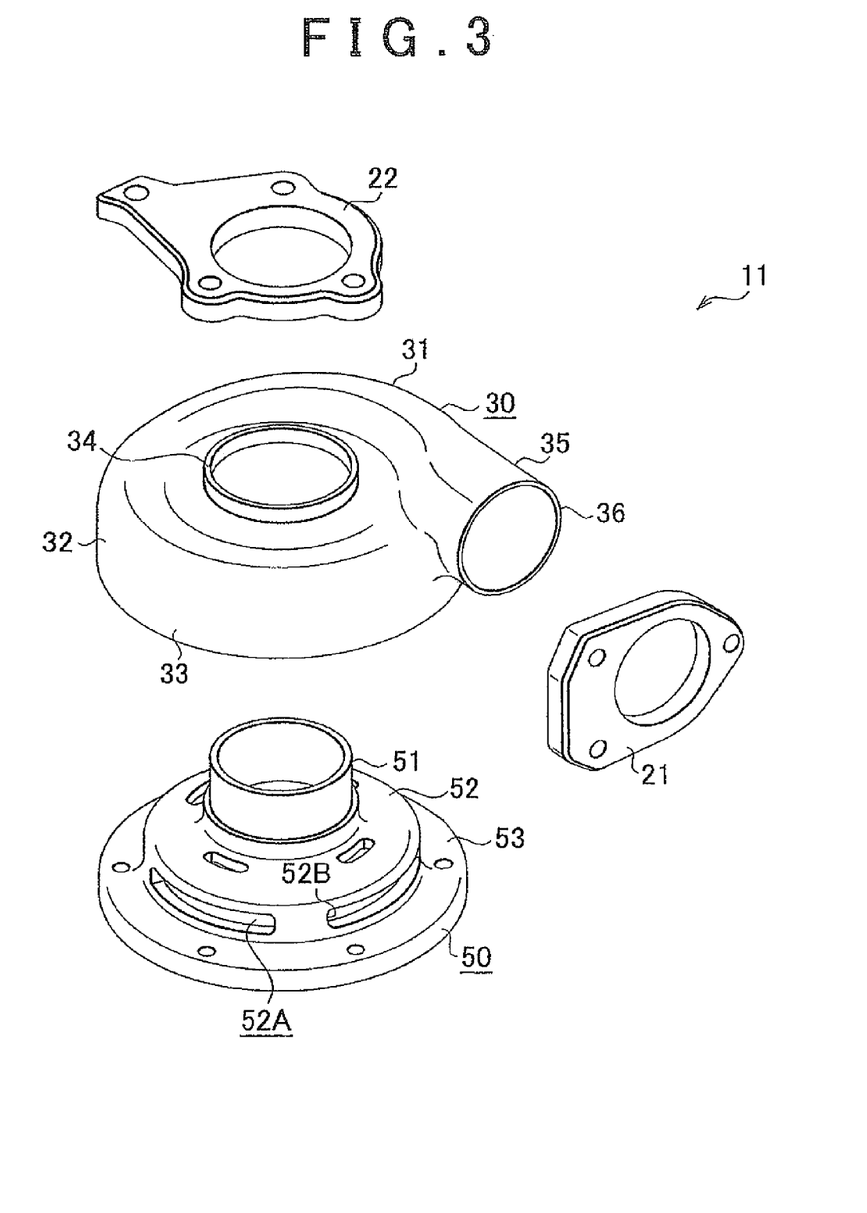
FIG. 3 is an exploded perspective view of the turbine housing in accordance with the first embodiment.
Figure 4:
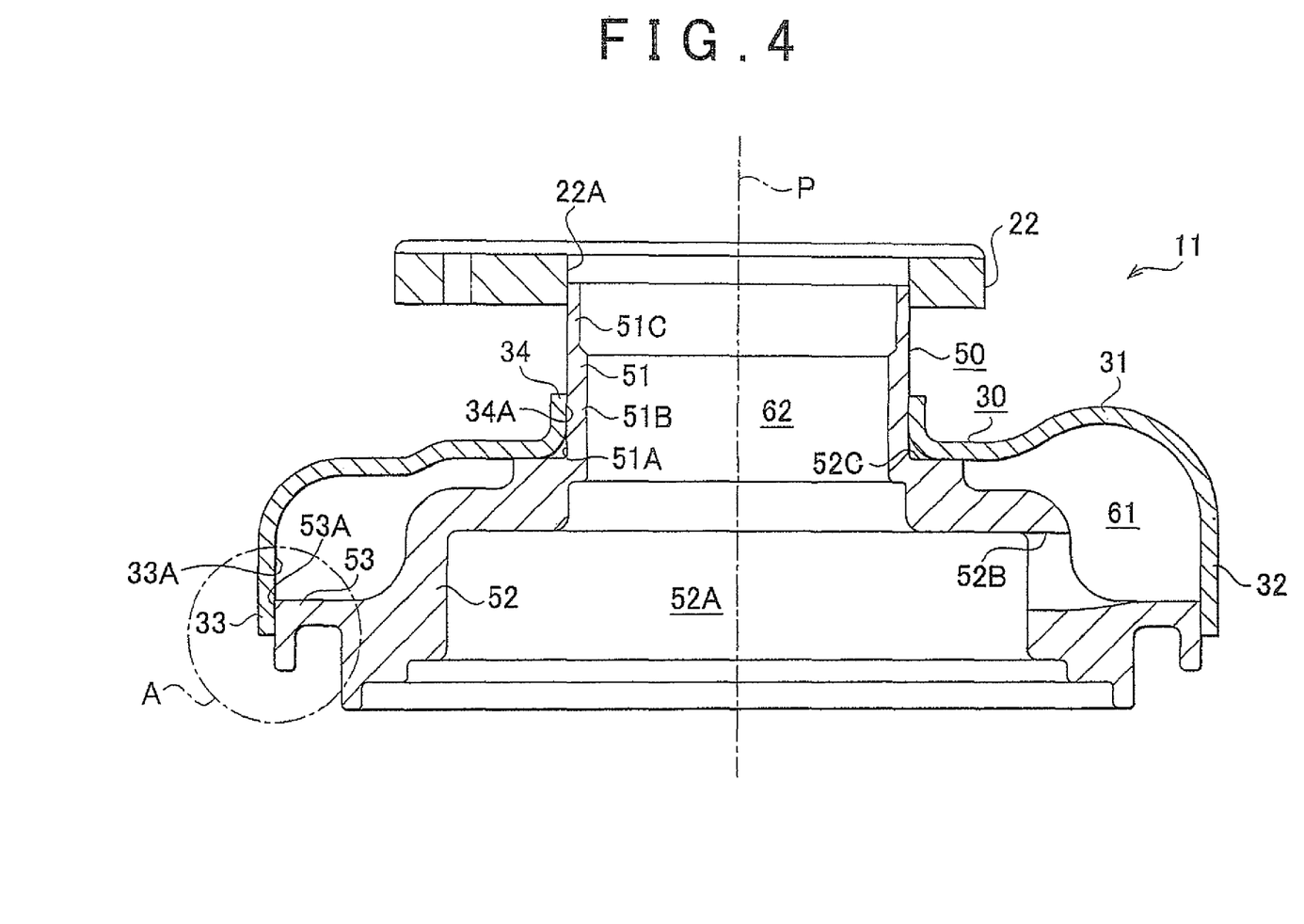
FIG. 4 is a sectional view of the turbine housing taken on line DA-DA in FIG. 2.

As shown in FIG. 3, the scroll body 30 includes a cylindrical portion 31, and an opening 35 that forms an inlet opening to the scroll body 30. The cylindrical portion 31 is provided with: a passageway portion 32, which is formed by a peripheral wall of the cylindrical portion 31 that extends in a circumferential direction and a top wall of the cylindrical portion 31 that radially extends and which forms the scroll passageway 61; a first joint portion 34 that is joined to a cylindrical portion 51 of the base body 50; and a second joint portion 33 that is joined to a flange portion 53 of the base body 50.

The inlet flange 21, to which the upstream-side exhaust pipe is connected, is joined to an inlet opening portion 35 of the scroll passageway 61. The base body 50 includes: a circular flange portion 53 that is connected to the center housing 13 (see FIG. 1); the cylindrical portion 51 to which the first joint portion 34 of the scroll body 30 and the outlet flange 22 are fitted; and a housing portion 52 in which the turbine wheel 81 is housed. The housing portion 52 interconnects the cylindrical portion 51 and the flange portion 53. Communication openings 52B are formed in the housing portion 52 to communicably connect the scroll passageway 61 with the wheel chamber 52A.

A longitudinal sectional structure of the turbine housing 11 will be described with reference to FIG. 4. FIG. 4 shows a structure of the turbine housing 11 in a section taken along line DA-DA in FIG. 2. A dashed one-dotted line P in FIG. 4 depicts the center line of the turbine housing 11 and the turbine wheel 81.

The first joint portion 34 of the scroll body 30 is fitted to an outside of a proximal end portion 51B of the cylindrical portion 51 of the base body 50. An outer peripheral surface 51A of the proximal end portion 51B is joined to an inner peripheral surface 34A of the first joint portion 34 by brazing. The inner peripheral surface 34A of the first joint portion 34 of the scroll body 30 thus impinges on the upper surface 52C of the housing portion 52.

The second joint portion 33 of the scroll body 30 is fitted to an outside of the flange portion 53 of the base body 50. An outer peripheral surface 53A of the flange portion 53 is joined to an inner peripheral surface 33A of the second joint portion 33 by brazing.

The outlet flange 22 is fitted to the outside of a distal end portion 51C of the cylindrical portion 51 of the base body 50. The outer peripheral surface 51A of the distal end portion 51C is joined to the inner peripheral surface 22A of the outlet flange 22 by brazing.

Within the turbine housing 11, the scroll passageway 61 is formed between the cylindrical portion 31, the housing portion 52 and the flange portion 53. In addition, the outlet passageway 62 is formed in the cylindrical portion 51. The scroll passageway 61 communicates with an inlet opening of the wheel chamber 52A via the communication opening portions 52B. The outlet passageway 62 communicates with the wheel chamber 52A.

Figure 5:
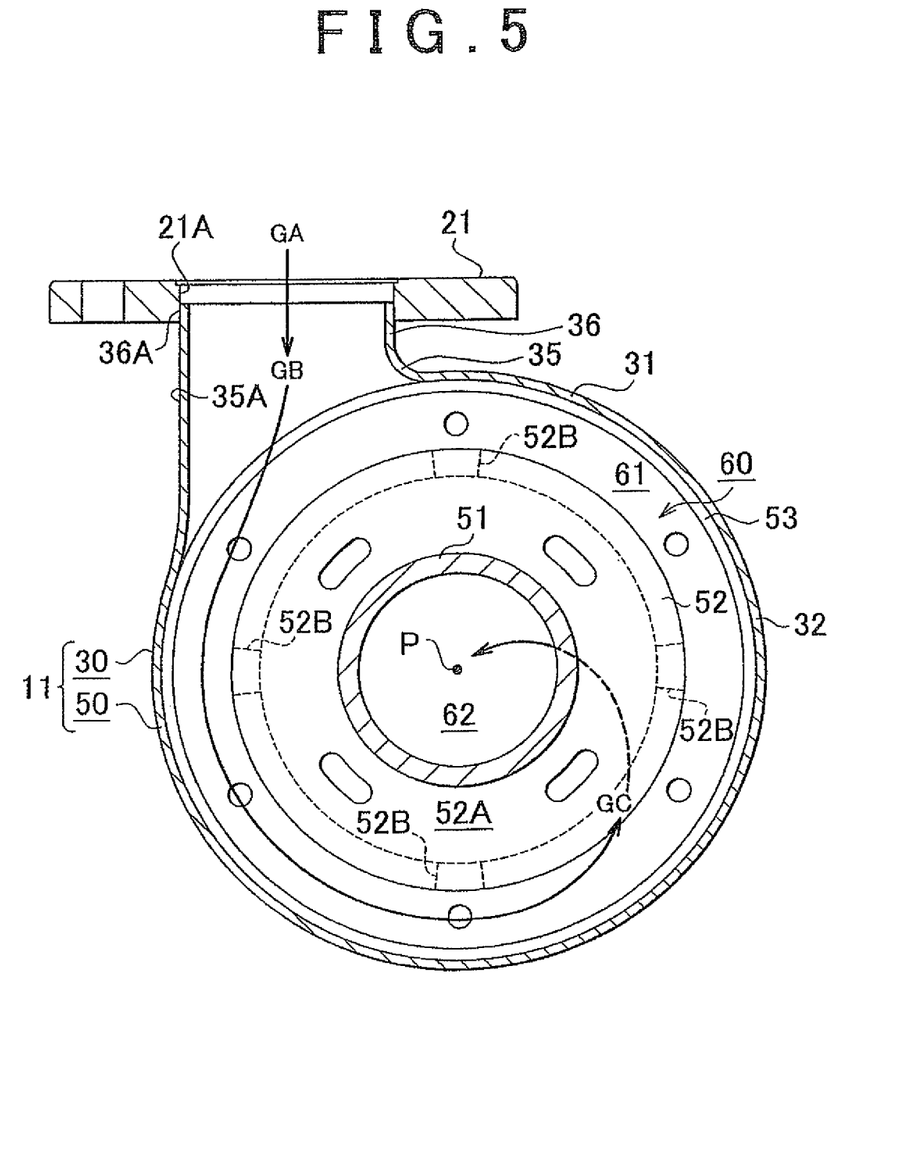
FIG. 5 is a sectional view of the turbine housing taken on line DB-DB in FIG. 2.

The cross-sectional structure of the turbine housing 11 will be described with reference to FIG. 5. FIG. 5 shows the cross-sectional structure of the turbine housing 11 as viewed along line DB-DB in FIG. 2. In addition, a point P in FIG. 5 shows the center line of the turbine housing 11 and the turbine wheel 81.

The inlet flange 21 is fitted to the outside of an inlet-side joint portion 36 of the opening 35. An outer peripheral surface 36A of the inlet-side joint portion 36 and an inner peripheral surface 21A of the inlet flange 21 are joined to each other by brazing.

Exhaust gas flows in the turbine housing 11 as follows. As shown by an arrow GA, exhaust gas in the exhaust pipe upstream of the turbine housing 11 flows into a scroll portion of the scroll passageway 61 via the opening 35. As shown by an arrow GB, the exhaust gas flowing into the inlet opening of the scroll passageway 61 flows around the housing portion 52 in the circumferential direction within the scroll passageway 61. As the exhaust gas flows, some of the exhaust gas flows into the wheel chamber 52A via the communication opening portions 52B. As shown by the arrow GC, the exhaust gas flowing into the wheel chamber 52A strikes blades of the turbine wheel 81, and is then directed into the outlet passageway 62 as the turbine wheel 81 rotates. The exhaust gas sent out into the outlet passageway 62 flows through the outlet passageway 62, and then flows into the exhaust pipe downstream of the turbine housing 11.

Figure 6:
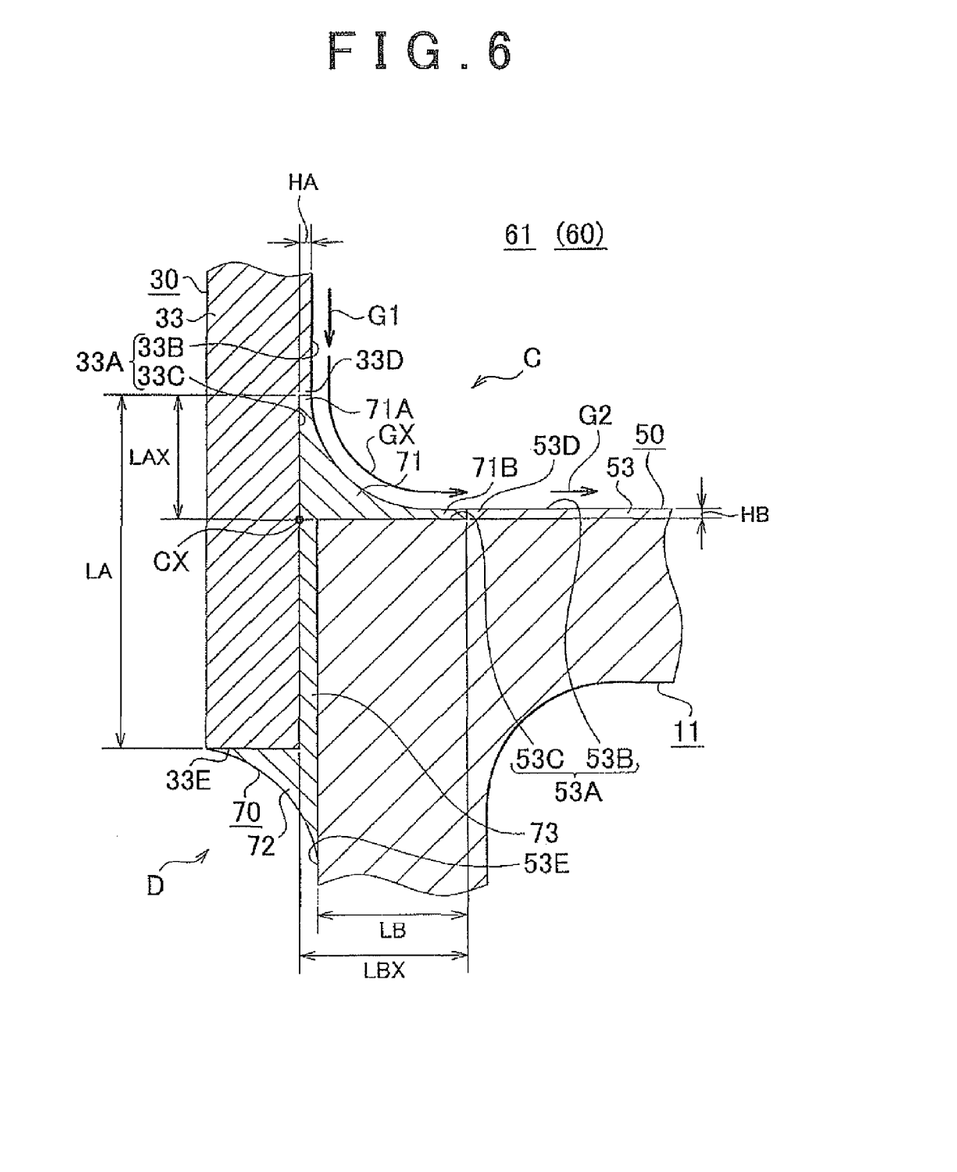
FIG. 6 is an enlarged sectional view of the turbine housing, showing the structure of a portion A shown in FIG. 5.

The manner in which the scroll body 30 and the base body 50 are joined will be described with reference to FIG. 6. FIG. 6 shows the structure of a portion A shown in FIG. 4 in an enlarged fragmentary sectional view. In addition, an arrow G1, an arrow G2 and an arrow GX depict the flows of exhaust gas.

At a scroll passageway 61 side of a fitting portion, where the second joint portion 33 of the scroll body 30 is fitted to the flange portion 53 of the base body 50, an inside corner portion C is formed by an inner peripheral surface 33A of the second joint portion 33, which faces the scroll passageway 61, and an outer peripheral surface 53A of the flange portion 53, which faces the scroll passageway 61. In addition, at an outer side of the fitting portion of the turbine housing 11, an outside corner portion D is formed by an end surface 33E of the second joint portion 33 and an end surface 53E of the flange portion 53.

Herein, a section of the turbine housing 11 taken along the center line of the turbine housing 11 is defined as a reference sectional plane, and two adjoining surfaces of two structural bodies formed separately and joined together (e.g., the scroll body 30 and the base body 50) which adjoin each other in the reference sectional plane are defined as a first adjoining surface and a second adjoining surface (e.g., the inner peripheral surface 33A and the outer peripheral surface 53A), respectively. Besides, a curve that at least partially lies on the first adjoining surface in the reference sectional plane is defined as a first curve, and a curve that at least partially lies on the second adjoining surface in the reference sectional plane is defined as a second curve. With the thus-defined factors with regard to the turbine housing 11, a region that includes a portion where the first curve and the second curve intersect and a portion adjacent to that portion can be said to be the inside corner portion C or the outside corner portion D. In the example configuration shown in FIG. 6, a straight line that partially lies on a lower step surface 33C of the second joint portion 33 corresponds to the first curve, and a straight line that partially lies on a lower step surface 53C of the flange portion 53 corresponds to the second curve, and point at which the first curve intersects with the second curve corresponds to the apex CX of the inside corner portion C.

The inner peripheral surface 33A of the second joint portion 33 of the scroll body 30 includes a first restriction portion 33D that is a stepped portion. Thus, the inner peripheral surface 33A includes an upper step surface 33B that is relatively close to the scroll passageway 61, and the lower step surface 33C that is relatively remote from the scroll passageway 61. The first restriction portion 33D is formed at a predetermined distance LA from an end surface 33E of the second joint portion 33 toward the scroll passageway 61 side.

The outer peripheral surface 53A of the flange portion 53 of the base body 50 includes a second restriction portion 53D that is a stepped portion. Thus, the outer peripheral surface 53A includes an upper step surface 53B that is relatively close to the scroll passageway 61, and the lower step surface 53C that is relatively remote from the scroll passageway 61. The second restriction portion 53D is formed at a predetermined distance LB from the end surface 53E of the flange portion 53 toward a center side of the flange portion 53.

The second joint portion 33 is joined to the flange portion 53 by a joint brazing material 70. The joint brazing material 70 includes an inside fillet 71 that is formed in the inside corner portion C, an outside fillet 72 that is formed in the outside corner portion D, and a filler portion 73 that fills the gap between the lower step surface 33C of the second joint portion 33 and the lower step surface 53C of the flange portion 53.

The inside fillet 71 extends from the first restriction portion 33D to the second restriction portion 53D. An inner peripheral surface of the inside fillet 71 is curved to change a direction G1 of the flow of exhaust gas along the inner peripheral surface 33A of the second joint portion 33 to a direction G2 along the outer peripheral surface 53A of the flange portion 53. Therefore, the flow of exhaust gas shown by the arrow G1 changes to directions of flow shown by the arrows GX and G2 in that order as exhaust gas flows along the inside fillet 71.

The size of the inside fillet 71 depends on the positions at which the first restriction portion 33D and the second restriction portion 53D are formed. Incidentally, the size of the inside fillet 71 means the distance between the apex CX of the inside cornet portion C and an end portion of the inside fillet 71 (hereinafter, referred to as "first end portion 71A"), and the distance between the apex CX of the inside corner portion C to the other end portion of the inside fillet 71 (hereinafter, referred to as "second end portion 71B").

In the turbine housing 11, the positions at which the first restriction portion 33D and the second restriction portion 53D are formed are set so that the distance LAX between the apex CX and the first restriction portion 33D is substantially equal to the distance LBX between the apex CX and the second restriction portion 53D. Therefore, in the inside corner portion C, the inside fillet 71 is formed of which the length from the apex CX to the first end portion 71A is substantially equal to the length from the apex CX to the second end portion 71B.

The thickness of the inside fillet 71 depends on the height of the first restriction portion 33D and the height of the second restriction portion 53D. In addition, the height of the inside fillet 71 means the distance between a surface of the inside fillet 71 and a fillet formation face at either of the first end portion 71A or the second end portion 71B on which the inside fillet 71 is formed (i.e., the lower step surface 33C or 53C).

In the turbocharger 1, the height HA of the first restriction portion 33D is substantially equal to the height HB of the second restriction portion 53D. Therefore, the thickness of the first end portion 71A of the inside fillet 71, formed in the inside corner portion C, is substantially equal to the thickness of the second end portion 71B.

Figure 7A:
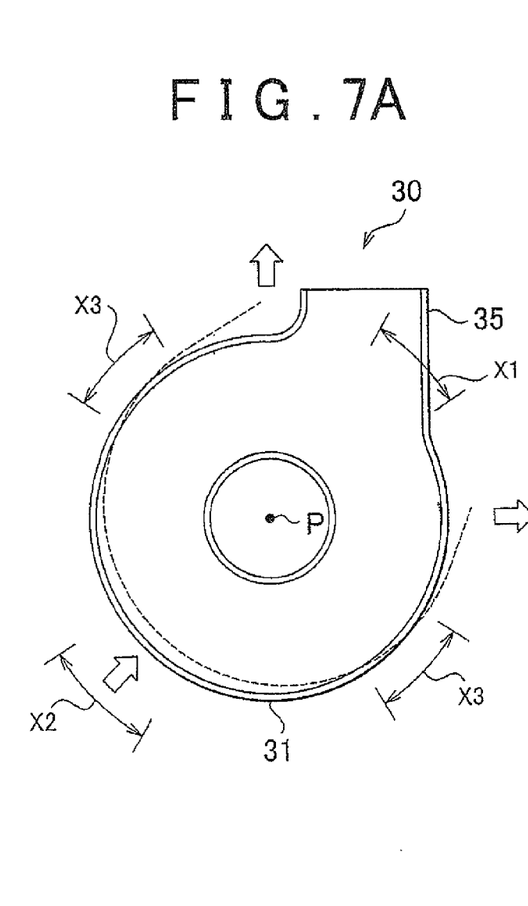
FIG. 7A is a schematic diagram of a modified scroll body of the turbine housing.
Figure 7B:
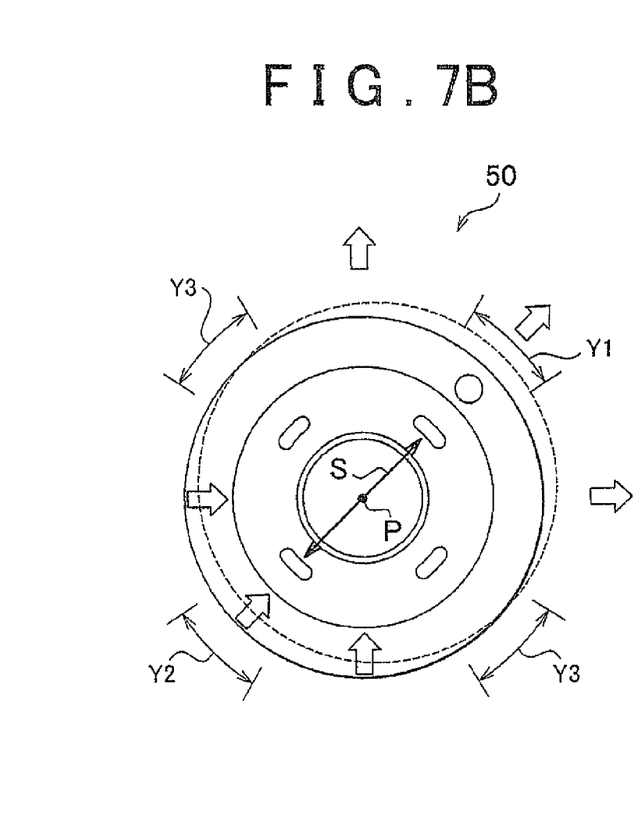
FIG. 7B is a schematic diagram of a modified base body of the turbine housing.

The process of assembling the scroll body 30 and the base body 50 will be described with reference to FIGS. 7A and 7B. FIG. 7A is a schematic plan view of the scroll body 30 viewed from the turbine wheel 81 side. FIG. 7B is a schematic plan view of the base body 50 viewed from the turbine wheel 81 side.

As shown in FIG. 7A, before the scroll body 30 is joined to the base body 50, residual stress is present as a result of the press forming process. The residual stress is released due to heat when the scroll body 30 and the base body 50 are joined by brazing. When the residual stress is released, the scroll body 30 deforms as shown by the dotted line in FIG. 7A.

As shown in FIG. 7B, residual stress in the direction S is present the base body 50, before being joined to the scroll body 30, due to rolling in the press forming process. The residual stress is released due to heat when the scroll body 30 and the base body 50 are joined by brazing. When the residual stress is released, the base body 50 deforms as shown by the dotted line in FIG. 7B.

In the following description, with regard to the distortion associated with the release of residual stress in the scroll body 30 and the base body 50, distortion in a direction away from the center point P is termed "distortion in the positive direction", and distortion in a direction toward the center point P is termed "distortion in the negative direction".

The amount of distortion in the scroll body 30 in the positive direction is greatest over a predetermined range of the circumference within the opening 35 of the scroll body 30 (hereinafter, referred as "positive-direction distortion site X1"), as shown in FIG. 7A. In addition, the amount of distortion in the negative direction in the scroll body 30 is greatest over a predetermined range of the circumference on the side of the center point P opposite from the positive-direction distortion site X1 (hereinafter, referred to as "negative-direction distortion site X2"). Furthermore, the amount of distortion in the positive direction and negative direction associated with the release of residual stress in the scroll body 30 are lowest over predetermined ranges along the circumference located at intermediate positions between the positive-direction distortion site X1 and the negative-direction distortion site X2 (hereinafter, referred to as "least-distortion sites X3").

Between the least-distortion sites X3 and either of the positive-direction distortion site X1 or the negative-direction distortion site X2, the amount of distortion gradually decreases toward the least-distortion sites X3 from either of the positive-direction distortion site X1 or the negative-direction distortion site X2.

As shown in FIG. 7B, the amount of distortion in the base body 50 is greatest in the positive direction over a predetermined range along the circumference in the direction S of rolling in the press forming process (hereinafter, referred to as "positive-direction distortion site Y1"). In addition, the amount of distortion in the base body 50 is greatest in the negative direction over a predetermined range along the circumference on the opposite side of the center point P from the positive-direction distortion site Y1 (hereinafter, referred to as "negative-direction distortion site Y2"). Furthermore, the amounts of distortion in the positive direction and negative direction associated with the release of residual stress in, the base body 50 are lowest over predetermined ranges extending along the circumference located at intermediate positions between the positive-direction distortion site Y1 and the negative-direction distortion site Y2 (hereinafter, referred to as "least-distortion sites Y3").

Between the least-distortion sites Y3 and either of the positive-direction distortion site Y1 or the negative-direction distortion site Y2, the amount of distortion gradually decreases toward the least-distortion sites Y3 from either of the positive-direction distortion site Y1 or the negative-direction distortion site Y2.

Herein, let it supposed that the scroll body 30 and the base body 50 are fitted to each other so that the positive-direction distortion site X1 of the scroll body 30, in which the amount of distortion in the positive direction is relatively large, corresponds to or coincides with the negative-direction distortion site Y2 of the base body 50 in the circumferential direction.

Accordingly, when the residual stress is released as the scroll body 30 and the base body 50 are brazed together, the deformation in the positive-direction distortion site X1 of the scroll body 30 separates the positive-direction distortion site X1 from the negative-direction distortion site Y2 of the base body 50. Therefore, large gaps are formed partly between the scroll body 30 and base body 50.

Therefore, during the assembly of the turbine housing 11, when the scroll body 30 is fitted to the base body 50, the phases of these structural bodies in the circumferential direction are set by taking into account the amounts of distortion in the positive and negative directions associated with the release of residual stresses in the structural bodies. In particular, the phases of the structural bodies in the circumferential direction are set so that the distortions in the positive and negative directions that occur in association with the brazing do not cause excessively large gaps to be formed between the scroll body 30 and the base body 50. The gaps herein mean gaps that are formed between the scroll body 30 and the base body 50 at the same circumferential positions on the scroll body 30 and the base body 50.

Figure 8:
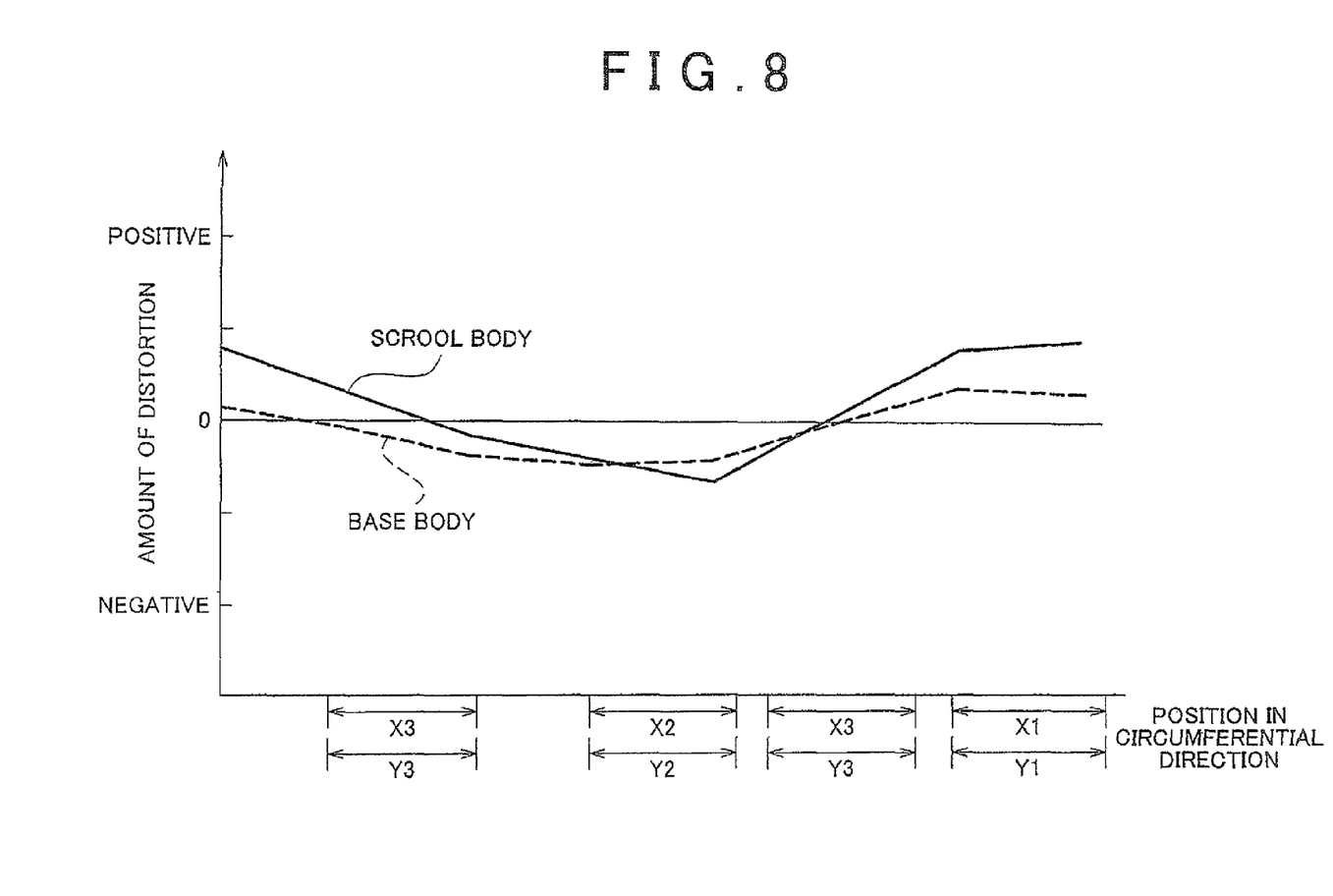
FIG. 8 is a graph showing relations between the positions in the scroll body and the base body of the turbine housing in the circumferential direction and the amounts of distortion.

Specifically, the relation between the position of the scroll body 30 in the circumferential direction and the position of the base body 50 in the circumferential direction is set as shown by the solid line and the dotted line in FIG. 8. That is, the phases of the scroll body 30 and the base body 50 in the circumferential direction are set so that the positive-direction distortion site X1 of the scroll body 30 and the positive-direction distortion site Y1 of the base body 50 are aligned with each other in the circumferential direction.

When the scroll body 30 is fitted to the base body 50 but not yet joined by brazing, the residual-stress is not released yet, so that the amounts of distortion of the scroll body 30 and the base body 50 in the positive direction and the negative direction are "0". That is, the foregoing sites of the scroll body 30 and the base body 50 are at the position of "0" in the amount of distortion in FIG. 8, so that the gap between the scroll body 30 and the base body 50 is "0" as well.

By joining the scroll body 30 to the base body 50 by brazing, the above-described sites undergo distortions in the positive and/or negative direction, so that the sites in the scroll body 30 are displaced to positions indicated by the solid line in FIG. 8 and the sites in the base body 50 are displaced to positions indicated by the dotted line in FIG. 8.

Because the distortion of the positive-direction distortion site X1 of the scroll body 30 and the distortion of the positive-direction distortion site Y1 of the base body 50 displace the scroll body 30 and the base body 50, respectively, in the same direction, the gaps formed between the scroll body 30 and the base body 50 in the circumferential direction are smaller than, for example, the gaps formed when the positive-direction distortion site X1 is aligned with the negative-direction distortion site Y2.

A process of joining the scroll body 30 to the base body 50 will be described.

[Step A] The scroll body 30 and the base body 50 are fitted together and then the positive-direction distortion site X1 of the scroll body 30 is aligned with the positive-direction distortion site Y1 of the base body 50.

[Step B] A hard solder is then disposed on each joined portion between the scroll body 30 and the base body 50.

[Step C] The scroll body 30 and the base body 50 are placed in a furnace and heated. During this process step, the hard solder melts and flows into the gaps in the joint portions between the scroll body 30 and the base body 50, so that the scroll body 30 is joined to the base body 50.

[Step G] The inlet flange 21 and the outlet flange 22 are fitted to their corresponding sites of the joined scroll body 30 and the base body 50.

[Step H] A hard solder is disposed on each of the joint portion between the scroll body 30 and the inlet flange 21 and the joint portion between the base body 50 and the outlet flange 22.

[Step J] The scroll body 30, the base body 50, the inlet flange 21 and the outlet flange 22 are placed in a furnace, and heated.

This embodiment achieves the following effects.

(1) At a joint portion between the scroll body 30 and the base body 50 in the embodiment, the inside corner portion C is formed by the inner peripheral surface 33A of the scroll body 30, which faces the exhaust passageway 60, and the outer peripheral surface 53A of the base body 50, which also faces the exhaust passageway 60. The inside fillet 71 is shaped to change the direction of flow of exhaust gas along the inner peripheral surface 33A of the scroll body 30 to a direction along the outer peripheral surface 53A of the base body 50 and is formed on the inside corner portion C. Therefore, it is possible to restrain occurrence of disturbance in the flow of exhaust gas in the exhaust passageway 60 while adopting a structure in which the scroll body 30 and the base body 50 are joined to each other.

(2) The scroll body 30 and the base body 50 in this embodiment are joined to each other by brazing. In addition, as the scroll body 30 and the base body 50 are joined, the inside fillet 71 is also formed as a guide portion. Because the brazing operation both joins the scroll body 30 with the base body 50 and forms the inside fillet 71 as a guide portion, the productivity of the turbocharger 1 can be improved.

(3) The inner peripheral surface 33A of the scroll body 30 in this embodiment is provided with the first restriction portion 33D that restricts the flow of the joint brazing material 70 that forms the inside fillet 71. Likewise, the flange portion 53a of the base body 50 is provided with the second restriction portion 53D. Therefore, the size of the inside fillet 71 is appropriately managed. This makes it possible to restrain the occurrence of a situation in which the inside fillet 71 is made excessively small in size and therefore fails to sufficiently achieve the effect of changing the direction of exhaust gas along the inner peripheral surface 33A of the scroll body 30 to a direction along the outer peripheral surface 53A of the base body 50.

(4) The turbine housing 11 in this embodiment includes the metal-sheet-made scroll body 30 and the metal-sheet-made base body 50 that are separately formed by pressing, and has a structure in which the scroll body 30 and the base body 50 are joined by brazing. Because the scroll body 30 and the base body 50 are joined by brazing, which achieves the junction at lower temperature than a welding process that joins members by melting the members themselves, it is possible to restrain excessively large deformation of the scroll body 30 and the base body 50 due to heat applied during the joining process (welding process). That is, in addition to reducing the weight of the turbocharger 1 by adopting metal-sheet-made members, it is possible to restrain the increase in the amount of the deformation of the members during the joining (welding) process, which will likely result from the adoption of the metal-sheet-made members.

(5) In the turbine housing 11 in the embodiment, its structural bodies, that is, the scroll body 30 and the base body 50, are joined together so that the positive-direction distortion site X1 of the scroll body 30, in which relatively large distortion occurs, and the positive-direction distortion site Y1 of the base body 50, in which relatively large distortion occurs, correspond in phase to each other. Therefore, the distortion in the positive-direction distortion site X1 and the positive-direction distortion site Y1 occurs in a direction that reduces the gap between the scroll body 30 and the base body 50, so that it is possible to restrain formation of large gaps in the joint portions between the scroll body 30 and the base body 50.

(6) In the turbine housing 11 in this embodiment, the scroll body 30 and the base body 50, which are major components of the turbine housing 11, are metal-sheet-made bodies. Therefore, the thickness of the turbine housing 11 wall in the turbocharger 1 is thinner than that of a cast metal turbine housing, so that the weight and heat capacity of the turbocharger 1 are reduced.

(7) If the method employed to join a scroll body 30 and a base body 50 melts portions of the structural bodies, that is, welding, there is a risk that the heat of the welding process may cause excessive deformation of the scroll body 30 and the base body 50.

In this embodiment, however, because the scroll body 30 and the base body 50 are joined by brazing, the temperature during the joining process is lower than in the above case where the structural bodies are joined by welding. Therefore, the deformation of the scroll body 30 and the base body 50 due to the heat during the joining process can be reduced. In addition, by restraining the deformation of these structural bodies, the deformation of the exhaust passageway 60 is also restrained. Thus, it is possible to restrain the increase in the pressure loss of the exhaust gas flow caused by the deformation of the exhaust passageway 60. Furthermore, substantially the same effects as described above are achieved with regard to the joint portions of the scroll body 30, the base body 50, the inlet flange 21 and the outlet flange 22.

(8) If the method employed to join a scroll body and a base body melts portions of the structural bodies themselves, a gap is formed between the inner peripheral surface 133A of the scroll body 130 and the outer peripheral surface 153A of the base body 150 as shown in FIG. 12. In this case, when exhaust gas strikes the inner peripheral surface 133A of the scroll body 130, excessively large stress concentration occurs in the joint portion 170 between the scroll body 130 and the base body 150.

In the turbine housing 11 in this embodiment, however, because the scroll body 30 and the base body 50 are joined by brazing, the gap between the second joint portion 33 and the flange portion 53 is sufficiently filled by the joint brazing material 70. Therefore, it is possible to restrain the concentration of excessively large stress in the second joint portion 33 and the flange portion 53. In addition, substantially the same effects as those described above are achieved with regard to the joint portions of the scroll body 30, the base body 50, the inlet flange 21 and the outlet flange 22.

(9) For example, if a configuration is adopted in which the inside corner portion C is provided with a guide portion, which is formed separately from the scroll body 30 and from the base body 50, it is necessary to dispose the guide portion in the inside corner portion C and join the guide portion to the inside corner portion C after the scroll body 30 has been fitted to the base body 50. However, once the scroll body 30 has been fitted to the base body 50, operators must perform the operation in an environment where operability is very low because a sufficient space for operation is not secured.

In the turbine housing 11 in the embodiment, however, the inside fillet 71 may be formed by performing a brazing operation from outside the scroll body 30 and the base body 50, so that the scroll body 30 may be easily joined with the base body 50.

A second embodiment of the invention will be described with reference to FIG. 9. A turbocharger in accordance with the second embodiment is constructed as a turbocharger in which a portion of the turbine housing according to the first embodiment is changed. The portion of the structure that is changed will be described in detail below. In other respects, the second embodiment is substantially identical to the first embodiment. Therefore, the components that are substantially the same as those of the first embodiment are denoted using the same reference characters, and descriptions thereof are omitted.

Figure 9:
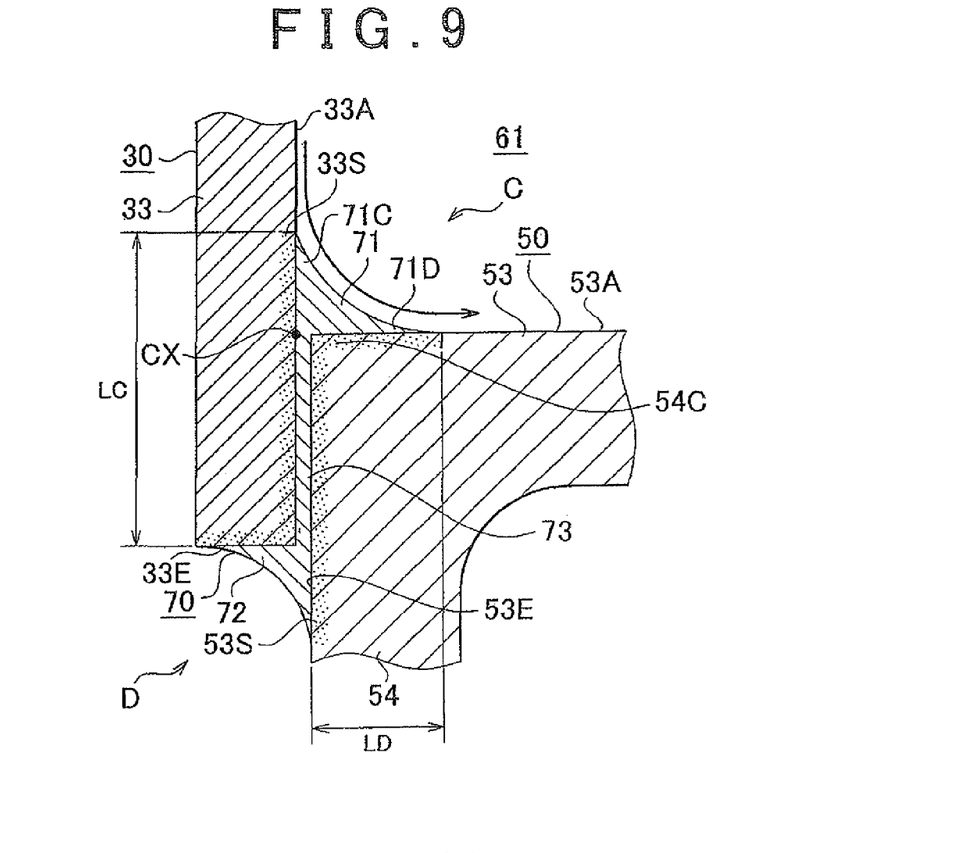
FIG. 9 is a sectional view of a turbocharger in accordance with a second embodiment of the invention.

As shown in FIG. 9, roughened surface portions 33S, which have been subjected to a surface roughing process to impart a greater surface roughness than at other surfaces of the scroll body 30, are formed on the inner peripheral surface 33A of a second joint portion 33 of the scroll body 30 and the end surface 33E of the second joint portion 33. In addition, roughened surface portions 53S that have also been subjected to the surface roughing process are formed on the outer peripheral surface 53A of a flange portion 53 of a base body 50 and the end surface 53E of the flange portion 53. The surface roughing process employed herein may be, for example, shot peening.

The roughened surfaces portion 33S of the inner peripheral surface 33A of the second joint portion 33 extends from the end surface 33E by a predetermined distance LC toward the scroll passageway 61. The roughened surface portion 33S of the end surface E extends over the entire end surface E. The roughened surface portion 53S of the flange portion 53a of the flange portion 53 extends from the end surface 53E by a predetermined distance LD toward the center of the flange portion 53. The roughened surface portion 53S of the end surface E extends over the entire end surface 53E.

The distance LC corresponds to the length from an apex CX of an inside corner portion C to a first end portion 71C of an inside fillet 71. The distance LD corresponds to the length from the apex CX of the inside corner portion C to a second end portion 71D of the inside fillet 71.

According to this embodiment, it is possible to achieve effect (1) of the first embodiment to restrain the occurrence of the disturbance of the flow of gas in the exhaust passageway 60 while adopting a structure in which the scroll body 30 is joined to the base body 50, and also the foregoing effects (2) and (4) to (9) of the first embodiment, and further achieve the following effects.

(10) In the turbine housing 11 according to this embodiment, the scroll body 30 is includes the roughened surface portions 33S, and the base body 50 is provided with the roughened surface portions 53S. This increases the wettability of the brazing material, so that the scroll body 30 and the base body 50 are more securely joined.

In addition, the embodiments of the invention are not restricted to the foregoing embodiments, but can also be implemented, for example, in the following forms. The following modifications are not only applicable to the above embodiments, but can also be carried out in combinations thereof.

Although the first restriction portion 33D and the second restriction portion 53D are formed as stepped portions in the first embodiment, the configuration of restriction portions is not limited so; that is, the restriction portions may adopt any configuration as long as the construction restricts the flow of the joint brazing material 70. For example, instead of at least one of the stepped portions formed as the first restriction portion 33D and the second restriction portion 53D, a groove or a wall may be formed.

Although the positions of the first restriction portion 33D and the second restriction portion 53D are set so that the distance LAX and the distance LBX of the inside fillet 71 are substantially equal to each other in the first embodiment, the positions at which the restriction portions are formed may be changed as follows. Specifically, the first restriction portion 33D and the second restriction portion 53D may be formed so that the distance LAX is less than the distance LBX. Instead, the first restriction portion 33D and the flange portion 53d may be formed so that the distance LAX is greater than the distance LBX.

In addition, although the stepped portions of the first restriction portion 33D and the second restriction portion 53D are formed so that the height HA and the height HB of the inside fillet 71 are substantially equal to each other in the first embodiment, the heights of the restriction portions may be changed as follows. Specifically, the first restriction portion 33D and the second restriction portion 53D may be formed so that the height HA is less than the height HB. In addition, the first restriction portion 33D and the second restriction portion 53D may be formed so that the height HA is greater than the height HB.

Although in the first embodiment, the second joint portion 33 of the scroll body 30 includes the first restriction portion 33D and the flange portion 53 of the base body 50 includes the second restriction portion 53D, one or both of the restriction portions may be omitted.

In the foregoing embodiments, when the scroll body 30 and the base body 50 are fitted together, the positive-direction distortion site X1 and the positive-direction distortion site Y1 correspond to or coincide with each other in the circumferential direction, which restrains the formation of large gaps between the scroll body 30 and the base body 50. However, alternative assembly processes may also be used, provided such processes adequately restrain the formation of a large gap. For example, the gap between the scroll body 30 and the base body 50 may be reduced by grasping beforehand the phases of the scroll body 30 and the base body 50 in the circumferential direction which minimize the total of areas between the distortion amount curve of the scroll body 30 and the distortion amount curve of the base body 50 shown in FIG. 8, and then setting the pre-grasped phases as the phases thereof in which the scroll body 30 and the base body 50 are placed when they are fitted to each other.

Although the turbine housing 11 is assembled by joining the scroll body 30 to the base body 50 by brazing and then the inlet flange 21 and the outlet flange 22 are joined to the scroll body 30 and the base body 50 by brazing, the assembly procedure is not restricted to this procedure. For example, the joining the scroll body 30, the base body 50, the inlet flange 21 and the outlet flange 22 may be carried out.

Figure 10:
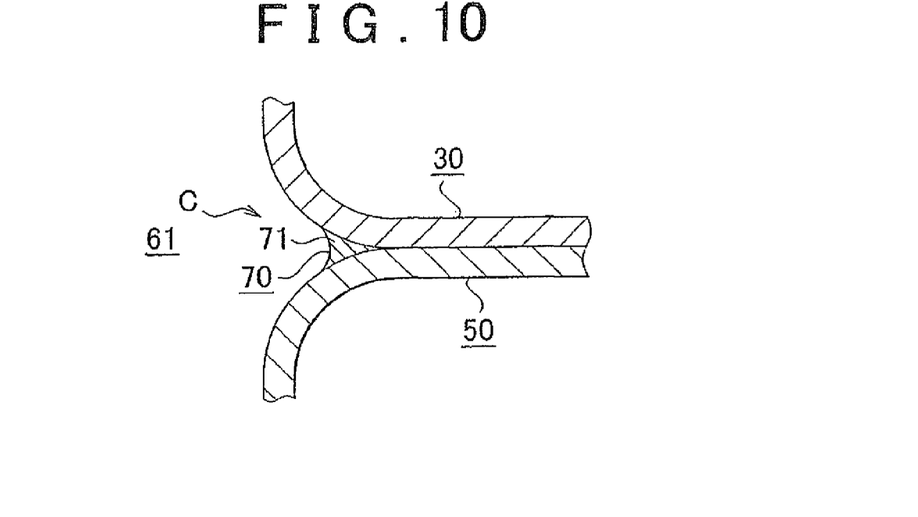
FIG. 10 is a sectional view of a corner portion of a turbine housing in a turbocharger in accordance with a modified embodiment of the invention.

In the above embodiments, the inside fillet 71 is formed in the inside corner portion C that is shaped as shown in FIG. 6. However, it is also permissible to form the inside fillet in relation to a corner portion that has a shape different from that shown for the inside corner portion C. For example, as shown in FIG. 10, if the scroll body 30 and the base body 50 are joined together so that a curved surface of the scroll body 30 and a curved surface of the base body 50 adjoin each other, and the two curved surfaces define an inside corner portion C therebetween, it is also permissible to form an inside fillet 71 in the inside corner portion C.

In the above embodiments, the scroll body 30, the bade body 50, the inlet flange 21 and the outlet flange 22 are joined by brazing. However, as long as the second joint portion 33 of the scroll body 30 is joined to the flange portion 53 of the base body 50 by brazing, it is possible to achieve the first embodiment's effects (1) to (3), (5), (6), (8) and (9) even if the other joints are formed by a means other than brazing.

Figure 11:
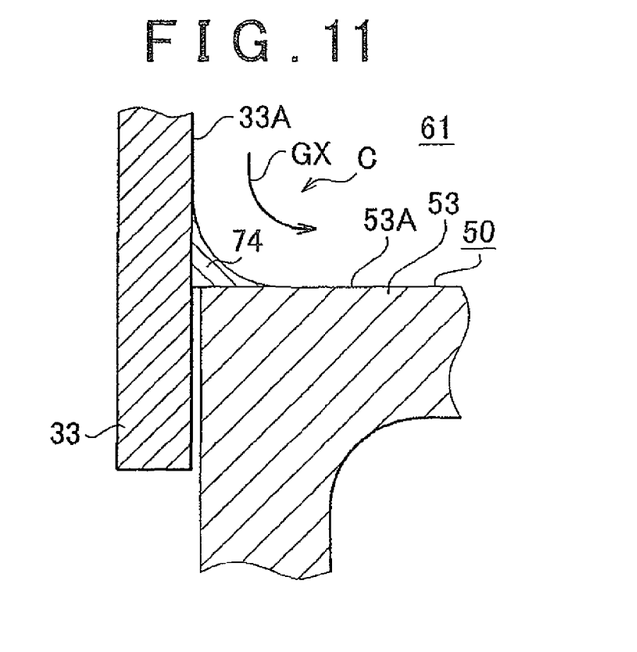
FIG. 11 is a sectional view of a corner portion of a turbine housing in a turbocharger in accordance with another modified embodiment of the invention.

Although in the above embodiments, the inside fillet 71 is formed as a guide portion, the construction of the guide portion is not limited so. For example, as shown in FIG. 11, it is also permissible to join to the inside corner portion C a guide portion 74 that has been formed separately from the scroll body 30 and the base body 50 and that has such a shape as to change the direction of exhaust gas along the inner peripheral surface 33A of the second joint portion 33 to a direction along the outer peripheral surface 53A of the flange portion 53. Examples of the method of joining the guide portion 74 to the scroll body 30 and the flange portion 53 include brazing, or even melting the guide portion 74 itself.

In the above embodiments, although the scroll body 30, the base body 50, the inlet flange 21 and the outlet flange 22 are separately formed and joined together to form the turbine housing 11, the construction of the turbine housing 11 is not restricted to this. For example, at least one of the separate structural bodies may be formed from a plurality of structural bodies. In addition, at least two of the foregoing structural bodies may be each formed as a unitary structural body.

Although in the above embodiments, the scroll body 30 and the base body 50 are metal-sheet-made bodies, at least one of these structural bodies may formed as a cast or resin-made body.

Although in the above embodiments, the invention is applied only to the turbine housing 11, and not the compressor housing 12, it is also possible to apply the invention to each of the turbine and compressor housings. Furthermore, it is also permissible to apply the invention the compressor housing 12.

The invention claimed is:

1. A wheel housing for a turbocharger comprising:
a first structural body;
a second structural body that is formed separately from the first structural body and that is joined to the first structural body; and
a gas passageway formed between the first structural body and the second structural body, wherein:
a joint portion between the first structural body and the second structural body is provided with a corner portion that is formed by a first surface of the first structural body which faces the gas passageway and a second surface of the second structural body which faces the gas passageway;
a guide portion that is shaped to change a direction of flow of a gas along the first surface to a direction along the second surface is formed on the corner portion;
the first structural body is joined to the second structural body by brazing; and
the guide portion is a fillet that is formed by the brazing, wherein:
the first structural body is a scroll body that is made of a press-formed metal sheet and that includes a scroll-shaped site;
the second structural body is a base body that includes: a cylindrical portion fitted to an outlet flange, a flange portion, and a housing portion in which a turbine wheel is housed, wherein the housing portion connects the cylindrical portion to the flange portion; and
the gas passageway is formed between an inner peripheral surface of the scroll-shaped site of the scroll body and an outer peripheral surface of the flange portion of the base body.

2. The wheel housing according to claim 1, wherein:
a first restriction portion that restricts flow of a brazing material that forms the fillet is formed in the first surface; and
a second restriction portion that restricts flow of the brazing material that forms the fillet is formed in the second surface.

3. The wheel housing according to claim 2, wherein:
the first structural body includes a first site at which a greatest distortion occurs when residual stress caused by press-forming is released;
the second structural body includes a second site at which a greatest distortion occurs when the residual stress caused by the press-forming is released; and
in the wheel housing, the first structural body and the second structural body are disposed and joined to each other so that a direction of deformation of the second site caused when the residual stress is released coincides with a direction of deformation of the first site caused when the residual stress is released.

4. The wheel housing according to claim 1, wherein the wheel housing is a turbine housing of the turbocharger.

5. The wheel housing according to claim 1, wherein the wheel housing is a compressor housing of the turbocharger.

6. A turbocharger comprising:
a wheel housing including:
a first structural body;
a second structural body that is formed separately from the first structural body and that is joined to the first structural body; and
a gas passageway formed between the first structural body and the second structural body, wherein:
a joint portion between the first structural body and the second structural body is provided with a corner portion that is formed by a first surface of the first structural body which faces the gas passageway and a second surface of the second structural body which faces the gas passageway;

a guide portion that is shaped to change a direction of flow of a gas along the first surface to a direction along the second surface is formed on the corner portion;

the first structural body is joined to the second structural body by brazing; and the guide portion is a fillet that is formed by the formed by the brazing wherein:

the first structural body is a scroll body that is made of a press-formed metal sheet and that includes a scroll-shaped site;

the second structural body is a base body that includes: a cylindrical portion fitted to an outlet flange, a flange portion, and a housing portion in which a turbine wheel is housed, wherein the housing portion connects the cylindrical portion to the flange portion; and the gas passageway is formed between an inner peripheral surface of the scroll-shaped site of the scroll body and an outer peripheral surface of the flange portion of the base body.

* * * * *